United States Patent
Muller-Berner

[15] 3,680,370
[45] Aug. 1, 1972

[54] DRIVE UNIT WITH SLIP INDICATOR FOR MOTOR VEHICLES

[72] Inventor: Alfred Hermann Muller-Berner, Waiblingen, Germany

[73] Assignee: Daimler-Benz Aktiengesellschaft, Stuttgart-Unterturkheim, Germany

[22] Filed: Jan. 30, 1970

[21] Appl. No.: 7,067

[30] Foreign Application Priority Data
Jan. 31, 1969 Germany............P 19 04 694.7

[52] U.S. Cl. ....................73/118, 73/168, 73/507
[51] Int. Cl. ..........................................G01m 13/02
[58] Field of Search .........73/118, 168, 507; 324/161

[56] References Cited

UNITED STATES PATENTS

| | | | |
|---|---|---|---|
| 2,015,731 | 10/1935 | Roth | 73/343 X |
| 1,669,584 | 5/1928 | Wilkes | 73/123 |
| 1,873,501 | 8/1932 | Semmes | 73/126 X |
| 2,975,633 | 3/1961 | Hautzenroeder | 73/118 |
| 3,273,384 | 9/1966 | Flaugher | 73/118 |
| 3,504,537 | 4/1970 | Cline | 73/126 |

*Primary Examiner*—Jerry W. Myracle
*Attorney*—Craig, Antonelli & Hill

[57] ABSTRACT

A drive unit for motor vehicles, especially for commercial-types of motor vehicles, in which in addition to a mechanical change-speed gear a hydraulic coupling or torque converter is provided as starting clutch; a warning installation is arranged in the drive unit which responds to a large slip between the turbine wheel and the pump wheel lasting for a longer period of time.

17 Claims, 3 Drawing Figures

DRIVE UNIT WITH SLIP INDICATOR FOR MOTOR VEHICLES

The present invention relates to a drive unit for motor vehicles, especially for commercial-type vehicles. In order to facilitate the starting, especially of commercial-type vehicles and thereby be able to decrease the number of mechanical speeds or transmission ratios with the necessary narrow staggering, one aims at utilizing in addition to the mechanical change-speed transmission, a hydraulic coupling or hydrodynamic torque converter. Such a drive combination, however, entails the disadvantage that with incorrect operation the possibility exists that the tractional force necessary for a predetermined driving resistance is produced in a high speed and with a very large hydraulic slip instead of shifting back to a lower speed. An excessively large hydraulic slip effects a temperature increase in the hydraulic medium whereby, when a certain temperature is exceeded, an endangering of the bearings and of the seals, etc., occurs.

The present invention aims at avoiding this disadvantage and at producing an installation which assures that the driver of a motor vehicle with a drive unit of the aforementioned type does not exceed for longer periods of time, a predetermined rotational speed difference between pump wheel and turbine wheel. The present invention essentially consists in that a warning installation responding to a large slip between turbine wheel and pump wheel of the hydraulic coupling or of the hydraulic torque converter which lasts for a longer period of time, is arranged in the drive unit. This warning installation calls to the driver's attention when an incorrect operation exists.

In order to enable an easy control, the warning installation may include an optical and/or acoustic signal transmitter. Appropriately, the signal transmitter is arranged in the driver cab within the field of vision of the driver.

An advantageous type of construction of the present invention is obtained when the turbine wheel and the pump wheel of a hydraulic coupling or of a hydraulic torque converter are provided each with a rotational speed measuring device which are connected to a common indicating apparatus. The existing rotational speed difference becomes recognizable thereby at a glance. It is particularly advantageous if the indicating apparatus for a rotational speed measuring device, preferably the indicating apparatus for the turbine wheel is equipped with an indicator or pointer in the form of a circular segment and if the indicating apparatus for the other rotational speed measuring device is equipped with a pin-shaped indicator or pointer. The pointer or indicator of circular-segment shape thereby corresponds to the permissive slippage range so that a non-permissive rotational speed difference becomes noticeable at once by the relative position of the two pointers. In order to take into consideration the time factor, which only itself conditions the danger of an excessively large slip, and in order to avoid an unnecessary warning, both pointers may be connected with each other by way of a conventional damping member.

In another type of construction of the present invention, the temperature resulting from a large slippage is utilized directly as measuring yardstick in that preferably a temperature-sensing device of the warning installation is arranged in the guide wheel of the torque converter or also in an element of the hydraulic coupling. The temperature-sensing member, in case of exceeding a predetermined temperature, closes an electric circuit, for example, by deformation of a contact and actuates the optical and/or acoustic warning installation. This type of construction is particularly suitable for motor vehicles with hydraulic torque converters because a fixed guide wheel is present in such constructions in which the temperature of the hydraulic medium can be measured in a simple manner.

In another embodiment of the present invention, the pump wheel and the turbine wheel of the hydraulic coupling or of the hydraulic torque converter, may be equipped with an electric voltage transmitter of any conventional construction. With such an electric monitoring system provision may be made additionally in an advantageous manner that the initiation of the beginning of the warning is controlled additionally by the absolute output rotational speed.

Accordingly, it is an object of the present invention to provide a drive unit for motor vehicles, especially commercial-type vehicles which avoids by simple means the aforementioned shortcomings and drawbacks.

Another object of the present invention resides in a drive unit for motor vehicles, especially for commercial-types of vehicles, equipped with a hydraulic coupling or hydrodynamic torque converter in the input of the change-speed gear, which minimizes the danger of incorrect operation of the vehicle and therewith the danger of damage to the bearings and seals of the transmission.

A further object of the present invention resides in a warning installation for indicating improper operation of a transmission of the type described above which is simple in construction, easy to install and eliminates the skill factor of the driver in operation.

These and further objects, features, and advantages of the present invention will become more obvious from the following description when taken in connection with the accompanying drawing which shows, for purposes of illustration only, two embodiments in accordance with the present invention, and wherein.

Figure 1:
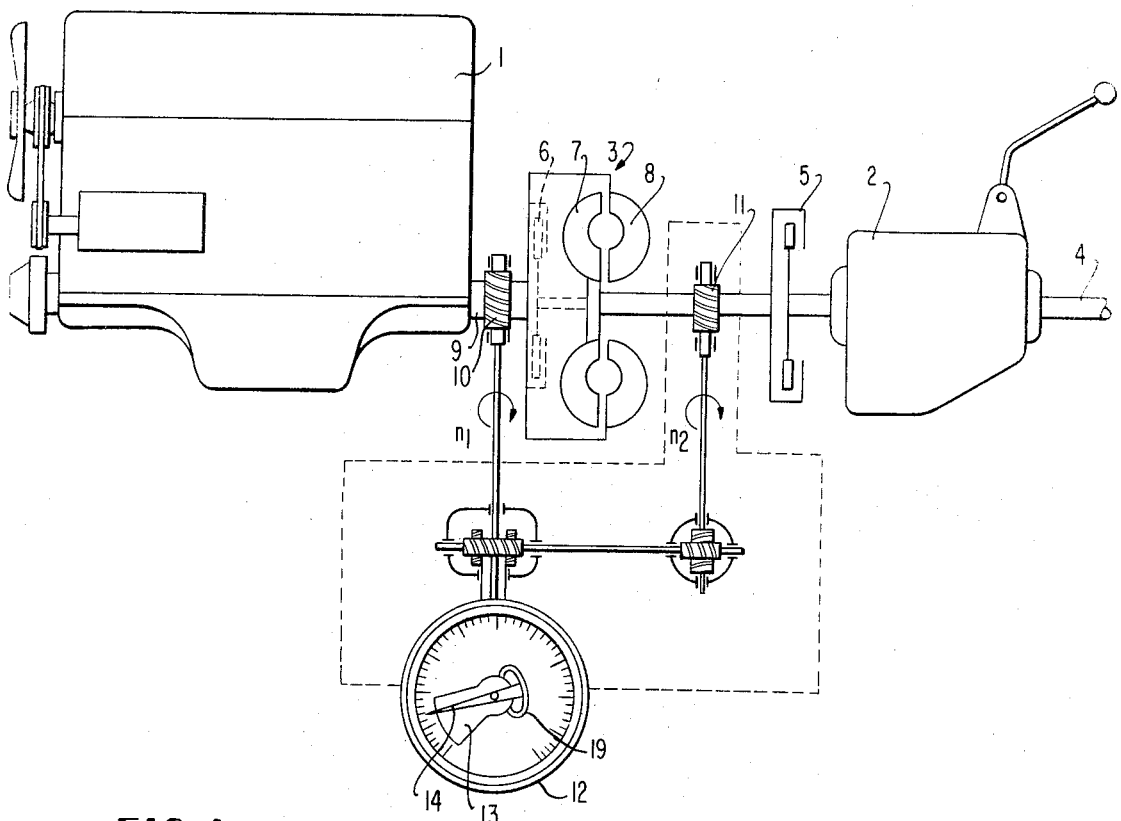
FIG. 1 is a somewhat schematic elevational view of a drive unit for a motor vehicle with a hydraulic coupling in accordance with he present invention.

Referring now to the drawing wherein like reference numerals are used throughout the various views to designate like parts, and more particularly to FIG. 1, the drive unit illustrated in this Figure consists of an engine 1 and of a change-speed transmission 2 of a conventional manual shifting type between which a hydraulic coupling generally designated by reference numeral 3 is arranged as starting clutch. The output shaft 4 from the change-speed gear 2 leads to the rear axle (not shown) of a vehicle. In order to be able to carry out the shifting operation, an additional separating clutch 5 is further provided between the change-speed gear 2 and this starting clutch 3. In order to avoid unnecessary fuel losses during the driving operation, the by-pass clutch 6 indicated in dash line may be provided between the turbine wheel 7 and the pump wheel 8 of the hydraulic coupling 3.

In order to avoid that, as a result of an incorrect operation, the tractional force necessary for a predetermined driving resistance is produced in too high a speed or transmission ratio of the mechanical change-speed gear 2 and with a very large hydraulic clip connected therewith, instead of shifting back to the lower speed, a warning installation is provided which indicates the presence of an excessively large slip. This warning installation consists of a rotational speed measuring drive 10 connected with the drive shaft 9 of the engine 1 and therewith with the pump wheel 8 of the hydraulic coupling 3 and of a further rotational speed measuring drive 11 connected to the turbine wheel 7. The rotational speed measuring drives 10 and 11 are connected with a common indicating apparatus 12. This indicating apparatus 12, otherwise of conventional construction, is equipped with two pointers 13 and 14, of which the pointer 13 is in the shape of a circular segment and the other pointer 14 is constructed of pin-shaped configuration. The pointer 13 of circular segment-like shape which is connected with the turbine wheel 7, possesses a width that corresponds to the permissive slip. If the pin-shaped pointer 14 moves beyond the circular segment-shaped pointer 13, a non-permissive slip exists which is made clearly noticeable. It is thereby appropriate if additionally a further acoustic and/or optical signal is produced by a signal transmitter connected in a conventional manner with the warning installation. Since such acoustic and optical signal transmitters are known as such in the art, a detailed description and showing thereof is dispensed with.

As long as the rotational speed between the engine 1 and therewith the pump wheel 8 and the turbine wheel 7 does not exceed an extent predetermined by the width of the segment-shaped pointer 13, no warning takes place. The width of the segment-shaped pointer 13 is to be selected and constructed dependent on the hydraulic construction and size and also on the cooling conditions of the hydraulic coupling 3.

Figure 2:
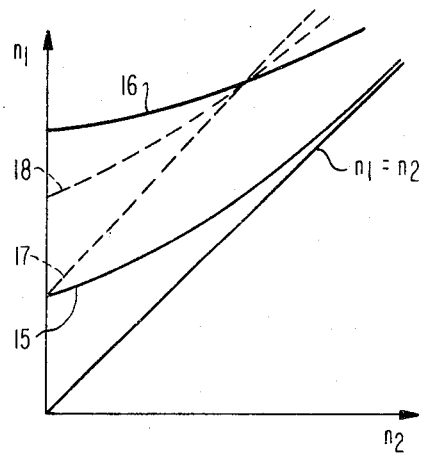
FIG. 2 is a diagram illustrating the function of a warning installation in accordance with the present invention.

In the diagram illustrated in FIG. 2, the rotational speed $n_1$ of the pump wheel 8 is plotted against the rotational speed $n_2$ of the turbine wheel 7 whereby the load condition of the engine appears as parameter at full load 16 and at idling speed 15. At full load 16, of course, a higher pump rotational speed results with standing turbine wheel 7 than during idling 15. The permissive width of the segment-shaped pointer 13 can now be kept in such a manner that the rotational speed difference during idling 15 is permitted in every case without indication. Only during a longer full-load drive, a warning takes place below a predetermined rotational speed range. The warning limit 17 is also illustrated in FIG. 2. The warning limit 17 represents an approximation to the thermal warning limit 18, predetermined as such, which does not extend parallel to the straight lines $n_1 = n_2$ in FIG. 2 but which could permit, for example, a larger slippage at lower output rotational speeds. In order not to warn unnecessarily in connection therewith, a time-wise damping is provided in the indicating apparatus 12 in that the two pointers 13 and 14 are connected with each other by a conventional damping member 19.

Figure 3:
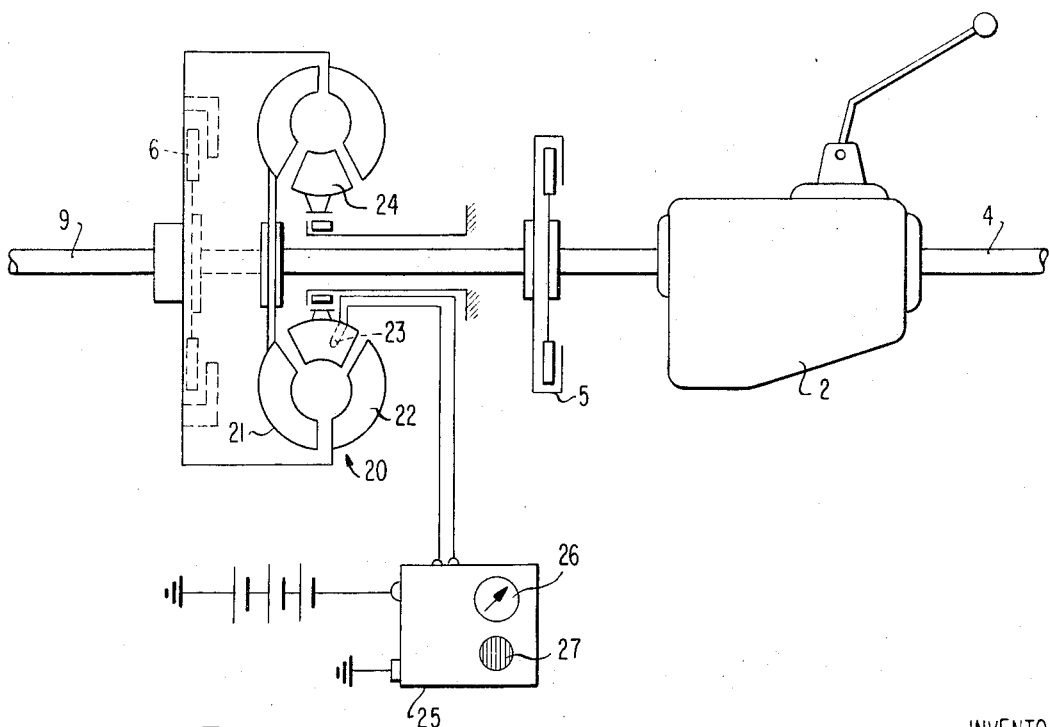
FIG. 3 is a somewhat schematic elevational view of a second embodiment of a drive unit for a motor vehicle with a hydraulic torque converter in accordance with the present invention.

Another embodiment of the present invention is illustrated in FIG. 3 in which the recognition is utilized that with an excessive slip, a heating-up takes place in the hydraulic medium. In this embodiment, a hydraulic torque converter generally designated by reference numeral 20 is arranged between the engine (not shown) and the change-speed gear 2, which serves as starting clutch whereas an additional separating clutch 5 for facilitating the shifting is provided between the torque converter 20 and the change-speed gear 2.

Also, in this embodiment a by-pass clutch 6 between the turbine wheel 21 and the pump wheel 22 of the hydraulic torque converter 20 may be provided. The warning installation consists in this embodiment of a thermol-element 23 which measures in the fixed guide wheel 24 of the hydraulic torque converter 20 the temperature of the hydraulic medium. The thermol-element 23 is connected with an installation 25 that includes a thermometer 26 and, for example, an acoustic signal transmitter 27 that is initiated by an excessively high temperature of the hydraulic medium.

Therebeyond, it is also possible to coordinate to the shaft of the pump wheel and to the shaft of the turbine wheel in the embodiments according to FIGS. 1 or 3, one electric voltage transmitter or generator, each, which produces a voltage dependent on the rotational speed thereof. With this electric measurement of the slippage, the beginning of the warning could then be controlled both in dependence on the rotational speed difference and also in dependence on the absolute output rotational speed.

While we have shown and described only several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

I claim:

1. In combination with a drive unit for an automotive vehicle containing a hydraulic clutch or torque converter between a drive engine and a gear shift system, wherein said clutch or converter has a pump wheel and a turbine wheel, a device for monitoring and indicating the relative rotational speeds of the pump wheel and the turbine wheel, comprising means to separately measure the rotational speeds of the pump wheel and the turbine wheel and means to separately display the measured speeds on a common indicator, and wherein said display means are connected to one another by a time delay means.

2. The combination of claim 1, further characterized in that the display means comprises pointer arms pivoted about a common axis on a calibrated dial.

3. The combination of claim 2, further comprising warning means which responds to predetermined differences in the rotational speeds of the turbine wheel and pump wheel.

4. The combination of claim 3, characterized in that the warning means includes an optical signal transmitter.

5. The combination of claim 3, characterized in that the warning means includes an acoustic signal transmitter.

6. The combination of claim 3, characterized in that the warning means includes both an optical and an acoustic signal transmitter.

7. The combination of claim 3, characterized in that said warning means includes means only indicating a large difference in the rotational speeds of the turbine wheel and the pump wheel that continue for a predetermined period of time.

8. The combination of claim 2, characterized in that one of the pointer arms is substantially in the form of a circular segment and the other of said pointer arms is substantially pin shaped.

9. The combination of claim 8, characterized in that the pointer arm in the form of a circular segment is associated with the turbine wheel.

10. The combination of claim 9, further comprising warning means which responds to predetermined differences in the rotational speeds of the turbine wheel and pump wheel, characterized in that the warning means includes at least one warning signal transmitter.

11. The combination of claim 1, characterized in that the means to measure the rotational speeds of the pump wheel and the turbine wheel each includes an electric voltage transmitter means producing a voltage dependent on the respective rotational speed thereof.

12. The combination of claim 1, further comprising warning means which responds to predetermined differences in the rotational speeds of the turbine wheel and pump wheel.

13. The combination of claim 12, further characterized in that the initiation of the warning means is dependent upon the maintenance of the predetermined differences in the rotational speeds for a predetermined length of time.

14. In combination with a drive unit for an automotive vehicle containing a hydraulic clutch or a hydraulic torque converter between a drive engine and a gear shift system, wherein said clutch or converter has a pump wheel and a turbine wheel, a device for monitoring and indicating slippage conditions between the pump wheel and the turbine wheel, comprising means to sense and indicate the temperature of the hydraulic medium in the clutch or torque converter, and warning means responsive to predetermined temperature ranges, further characterized in that delaying means are provided for assuring that said warning means is initiated only after the maintenance of the predetermined temperature over a predetermined period of time.

15. The combination of a hydraulic torque converter having a pump wheel and a turbine wheel, and a device for monitoring and indicating the relative rotational speeds of the pump wheel and the turbine wheel, said device comprising means to separately measure the rotational speeds of the pump wheel and the turbine wheel and means to separately display the measured speeds on a common indicator, said display means being connected to one another by a time delay means.

16. The combination of claim 15, further characterized in that the display means comprises pointer arms pivoted about a common axis on a calibrated dial.

17. The combination of claim 15, further comprising warning means which responds to predetermined differences in a rotational speed of the turbine wheel and pump wheel.

* * * * *